United States Patent
Kenagy et al.

(10) Patent No.: US 7,184,618 B2
(45) Date of Patent: Feb. 27, 2007

(54) OPTICAL SWITCH ARRAY FOR ROUTING MULTIPLE OPTICAL SIGNALS

(75) Inventors: Donald A. Kenagy, Atlanta, GA (US); Roy Guynn, Blacksburg, VA (US); John Carberry, Talbott, TN (US); Reddy Urimindi, Plano, TX (US)

(73) Assignee: Neptec Optical Solutions, Inc., Fremont, CA (US)

( * ) Notice: Subject to any disclaimer, the term of this patent is extended or adjusted under 35 U.S.C. 154(b) by 0 days.

(21) Appl. No.: 11/033,604

(22) Filed: Jan. 12, 2005

(65) Prior Publication Data

US 2006/0153493 A1    Jul. 13, 2006

(51) Int. Cl.
    *G02B 6/35* (2006.01)
(52) U.S. Cl. .......................................... 385/17; 385/18
(58) Field of Classification Search ............ 385/16–24; 398/83, 12, 19; 359/212, 16
    See application file for complete search history.

(56) References Cited

U.S. PATENT DOCUMENTS

| | | | |
|---|---|---|---|
| 5,710,846 A | 1/1998 | Wayman et al. | |
| 5,726,788 A | 3/1998 | Fee et al. | |
| 6,243,511 B1 | 6/2001 | Laughlin | |
| 6,522,800 B2 | 2/2003 | Lucero | |
| 6,542,653 B2 | 4/2003 | Wu et al. | |
| 6,545,783 B1 * | 4/2003 | Wu et al. | 398/83 |
| 6,571,030 B1 | 5/2003 | Ramaswami et al. | |
| 6,606,429 B1 | 8/2003 | Carberry et al. | |
| 6,735,006 B2 * | 5/2004 | Carberry et al. | 359/212 |
| 6,950,215 B2 * | 9/2005 | Fant et al. | 359/16 |
| 2002/0061159 A1 | 5/2002 | Dahmani et al. | |
| 2003/0128915 A1 | 7/2003 | Smith et al. | |
| 2003/0206682 A1 | 11/2003 | Guynn et al. | |
| 2003/0231837 A1 | 12/2003 | Jones et al. | |
| 2004/0027640 A1 | 2/2004 | Carberry et al. | |
| 2004/0057129 A1 | 3/2004 | Tekippe | |

\* cited by examiner

*Primary Examiner*—John D. Lee
(74) *Attorney, Agent, or Firm*—Pitts & Brittian, PC

(57) ABSTRACT

An apparatus for routing a plurality of optical input signals to a plurality of optical output connections. In one embodiment, a plurality of optical switches are combined to route a number of optical signals that exceed the number of optical inputs for a single switch. The switch array includes a plurality of input switches optically connected to a plurality of intermediate switches, which are optically connected to a plurality of output switches. In the embodiments in which the number of input switches exceed the number of optical outputs of a single input switch, the input switches, intermediate switches, and output switches are arranged in groups or sets.

43 Claims, 12 Drawing Sheets

OPTICAL SWITCH ARRAY FOR ROUTING MULTIPLE OPTICAL SIGNALS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an optical switch array, that is, a switch array for optical signals, such as those carried by fiber optic cables. More particularly, this invention pertains to a switch array made up of a plurality of optical switches and that routes a plurality of optical input signals to a plurality of optical output connections.

2. Description of the Related Art

Optical signals, like their electrical signal counterparts, travel paths that need to be directed to specific locations and those locations are susceptible to change. Electrical signals pass through switches, or routers, that direct any one of a multitude of inputs to any one of a multitude of outputs. Such electrical switches vary in complexity to simple mechanical switches that make and break electrical connections to more complex electrical switches that use circuitry to route the electrical signals.

Optical switching, or routing, initially was performed by plugging in selected fiber optic cables to selected connectors, thereby forming an optical connection. Various switches have been developed to solve the problem of automating optical switching, or routing.

For example, U.S. Pat. No. 6,522,800, titled "Microstructure switches," issued to Lucero on Feb. 18, 2003, discloses one embodiment of micro-machined devices of silicon (MEMS). Lucero discloses "a microstructure switch having a main body, a moveable switching element, one or more membranes which connect the moveable switching element to the main body and an actuator which moves the moveable switching element from a first position to a second position. The membranes may be either or both of a primary membrane or a secondary membrane. A primary membrane may be used as a temporary membrane which serves to position the moveable switching element until it is permanently positioned by a secondary membrane, or by an actuator. At this point the temporary membrane is removed."

U.S. Pat. No. 6,571,030, titled "Optical cross-connect switching system," issued to Ramaswami, et al., on May 27, 2003, discloses an optical cross-connect switching system that includes micro-machined mirrors and a servo system for directing optical signals to the mirrors. Ramaswami discloses a switch subsystem 110 that includes optical switch matrices 241 and 242 that include multiple arrays 300 of micro-machined mirrors that have a mirrored surface 311 and torsional flexures 320, 330 that enable the mirror 310 to adjust its physical orientation to reflect incoming light signals in any selected direction.

U.S. Pat. No. 5,726,788, titled "Dynamically reconfigurable optical interface device using an optically switched backplane," issued to Fee, et al., on Mar. 10, 1998, discloses an optical interface device using 1×2 optical switches as a basic building block to build N×M switches. A 1×2 optical switch is a switch having a single optical input that is switched between two optical outputs, and Fee does not disclose any structural details of such a switch. Fee discloses a construction of a 1×4 switch and a 4×4 switch using a plurality of 1×2 switches.

One consideration in constructing and using optical switches, or routers, is the bending radius of the fiber optic cable. Fiber optic cables have a minimum bend radius, which is large relative to the cable diameter. Accordingly, routing of fiber optic cables oftentimes determines the size and layout of fiber optic equipment, which is commonly rack mounted with input and output connections accessible from a front panel. In order to accommodate high density requirements, it is desirable to minimize the size of fiber optic equipment.

It is also desirable to minimize attenuation of the optical signals in optical equipment. A factor that affects attenuation is the dimensional stability of the components in the optical equipment. The optical signal from an fiber optic cable has a small size and small changes in alignment, for example, due to changes in temperature, may cause attenuation of the optical signal. Further, it is desirable to operate optical equipment over a wide temperature range, which is at odds with the desire to minimize attenuation.

BRIEF SUMMARY OF THE INVENTION

According to one embodiment of the present invention, an optical switch array is provided. The optical switch array includes a plurality of optical switches that include actuators that route a plurality of optical signals to a plurality of optical outputs.

A plurality of optical switch assemblies are connected in such a manner that a number of optical inputs greater than those for a single switch are routed to a number of optical outputs. In one embodiment, the basic building block is an N×N optical switch in which the number of optical inputs equals the number of optical outputs.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
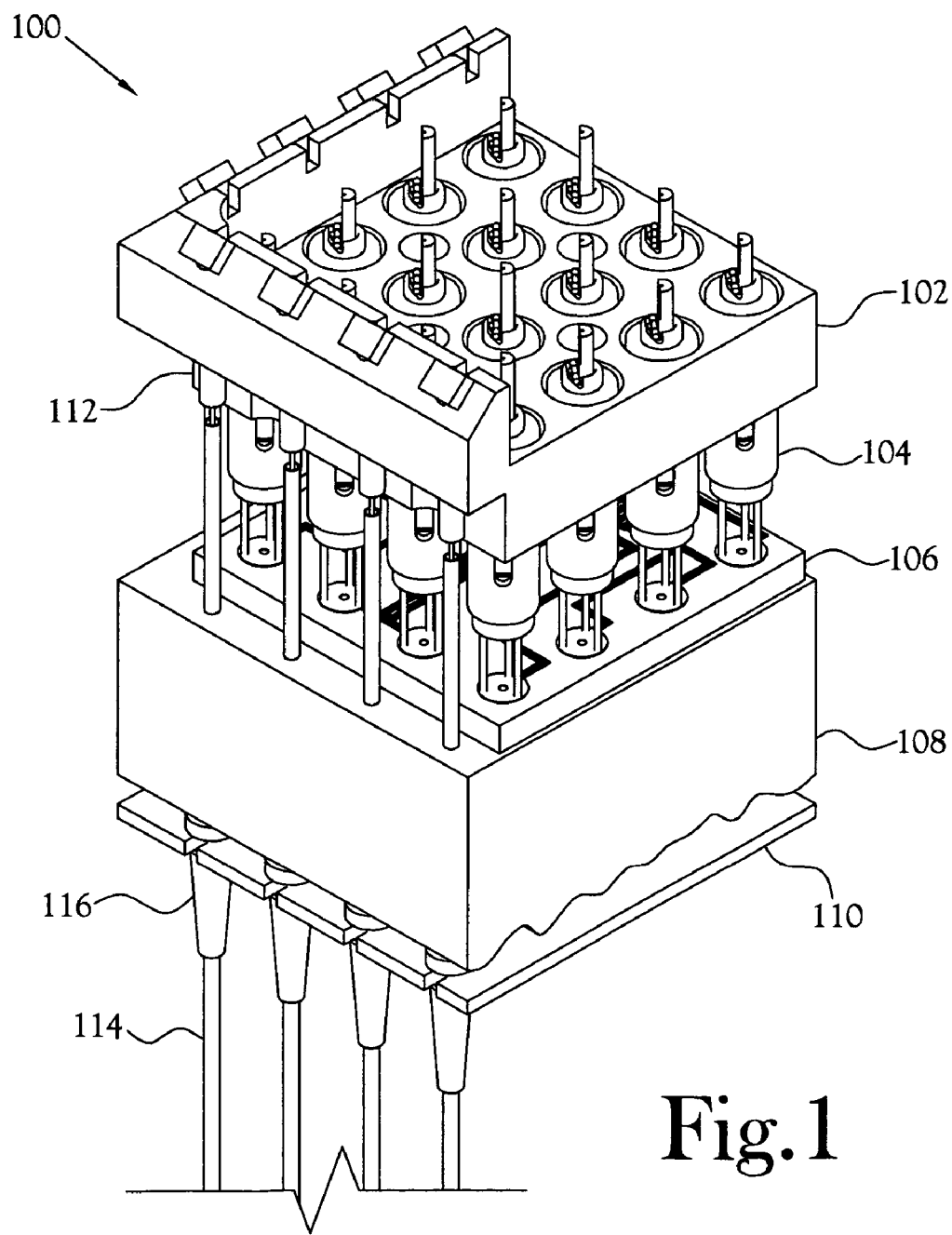
FIG. 1 is a perspective view of one embodiment of a 4×4 switch without the cover.

An apparatus for routing a plurality of optical signals to a bank of outputs is disclosed. The optical switch 100, in the illustrated embodiment, has four optical inputs and four optical outputs, and the switch 100 allows each of the four inputs to be routed to any of the four outputs. As used herein, a switch is a single, integrated device that selectively makes optical connections between one or more inputs and one or more outputs and is not divisible into smaller switches with a lesser number of inputs and outputs. Also, as used herein, a switch array is a collection of switches, and the switch array selectively makes optical connections between a plurality of inputs and a plurality of outputs FIG. 1 illustrates a perspective view of one embodiment of a 4×4 switch 100 without the cover 202 in place. The illustrated embodiment of the 4×4 switch 100 includes a switch body, or optical bench, 102 with sixteen switch actuators 104 arranged in an array. The actuators 104 are electrically connected to a circuit board 106, which is positioned above a block of hydrophobic gel 108. Below the gel block 108 is the bottom cover plate 110. Extending through the bottom cover plate 110, the gel block 108, and into the switch body 102 are the collimators 112 with attached fiber optic pigtails 114. It is apparent in FIGS. 1, 2, and 3 that the fiber optic pigtails 114 connected to the collimators 112 are parallel and adjacent. The illustrated arrangement of the fiber optic pigtails 114 permits the pigtails 114 to be routed to an interface panel containing optical input and output connections, and such routing requires minimal bending of the pigtails 114 and any other optical cables.

The collimators 112 are in two groups: one for receiving optical input signals and another for transmitting optical output signals. The actuators 104 have mirrors that reflect and redirect the optical input signals to the collimators 112 that transmit the optical output signals. The actuators 104 are selectively operated to route the optical output signals to selected output collimators 112.

The illustrated embodiment of the switch 100 has four input collimators 112 and four output collimators 112. Those skilled in the art will recognize that the number of input collimators 112 and output collimators 112, along with the number of actuators 104, can vary without departing from the spirit and scope of the present invention.

Figure 2:
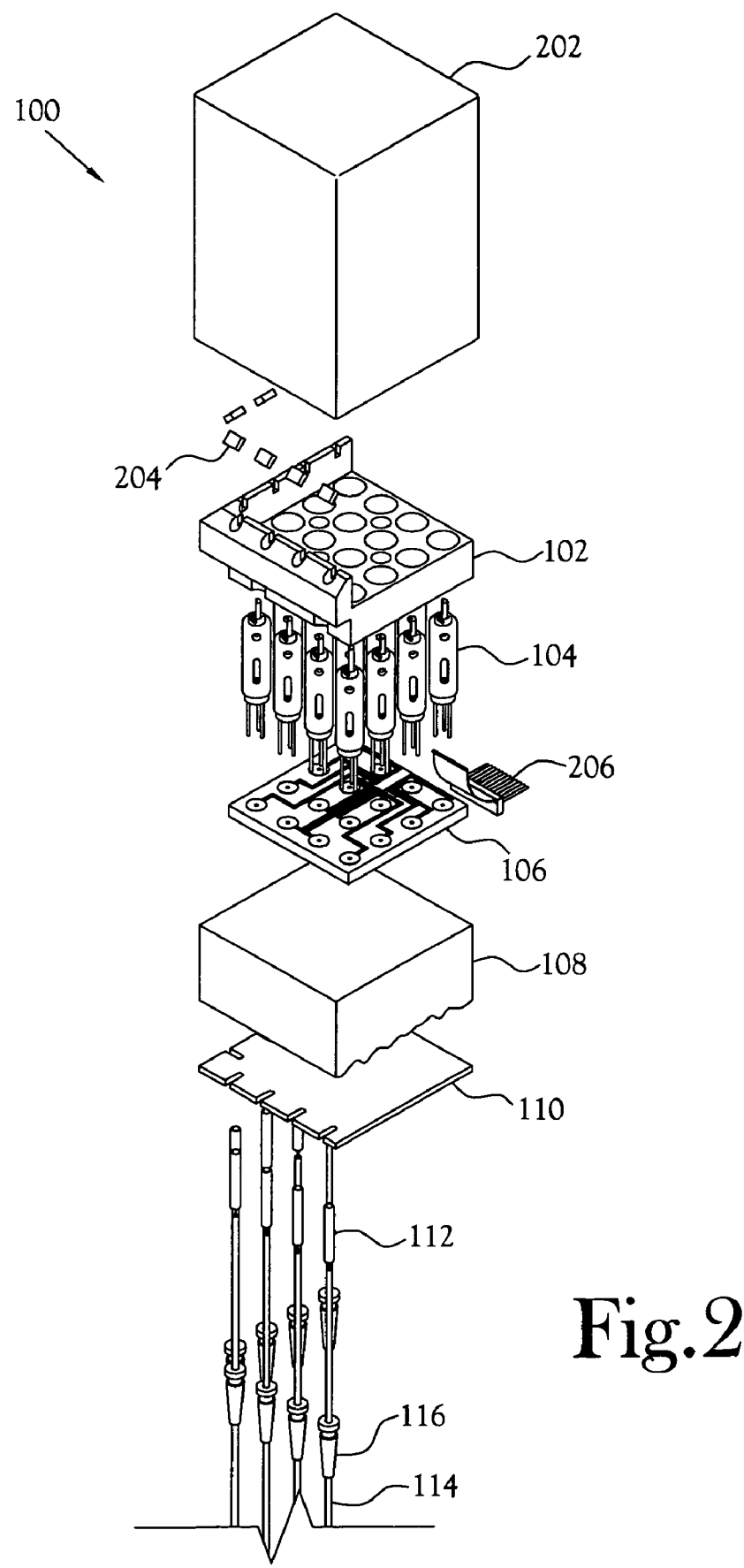
FIG. 2 is an exploded view of one embodiment of the 4×4 switch.

FIG. 2 illustrates an exploded view of the embodiment of the 4×4 switch 100 shown in FIG. 1. FIG. 2 shows the cover 202 that is placed over the components. The cover 202 protects the switch 100 from contamination and also prevents external light sources from interfering with the optical signals passing through free space. The cover 202 is secured to the bottom cover plate 110 to encapsulate the switch internals.

The hydrophobic gel block 108, in one embodiment, is positioned adjacent the bottom cover plate 110. In one embodiment, the gel block 108 seals the opening of the cover 202. The gel block 108 serves to repel water and moisture from entering into the volume bounded by the cover 202 and which contains the portion of the switch 100 in which the optical signal travels in free space.

The switch body 102 is adapted to receive and secure the array of actuators 104. The actuators 104 have a movable mirror 404 (shown in FIG. 4) that, in the extended position, intercepts and redirects an optical signal, and in the retracted position, allows the optical signal to pass unimpeded. The opposite end of each actuator 104 includes the electrical leads for controlling the operation of the actuator 104. Examples of actuators 104 are illustrated in U.S. Pat. No. 6,606,429, titled Electromechanically Controlled Optical Element, and U.S. Pat. No. 6,735,006, titled Optical switch assembly. In one embodiment, the actuators 104 are latching actuators, that is, electrical power is applied to energize the actuator and move the actuator mirror 404 to either the extended or retracted position. After electrical power is removed, the actuator mirror 404 is latched in the position to which it was moved.

The electrical leads extending from the actuator 104 are connected to the circuit board 106. A cable assembly 206 connects to the circuit board 106 and provides electrical connection between the switch 100 and external devices. In one embodiment, the cable assembly 206 passes through an opening in the cover 202.

Figure 4:
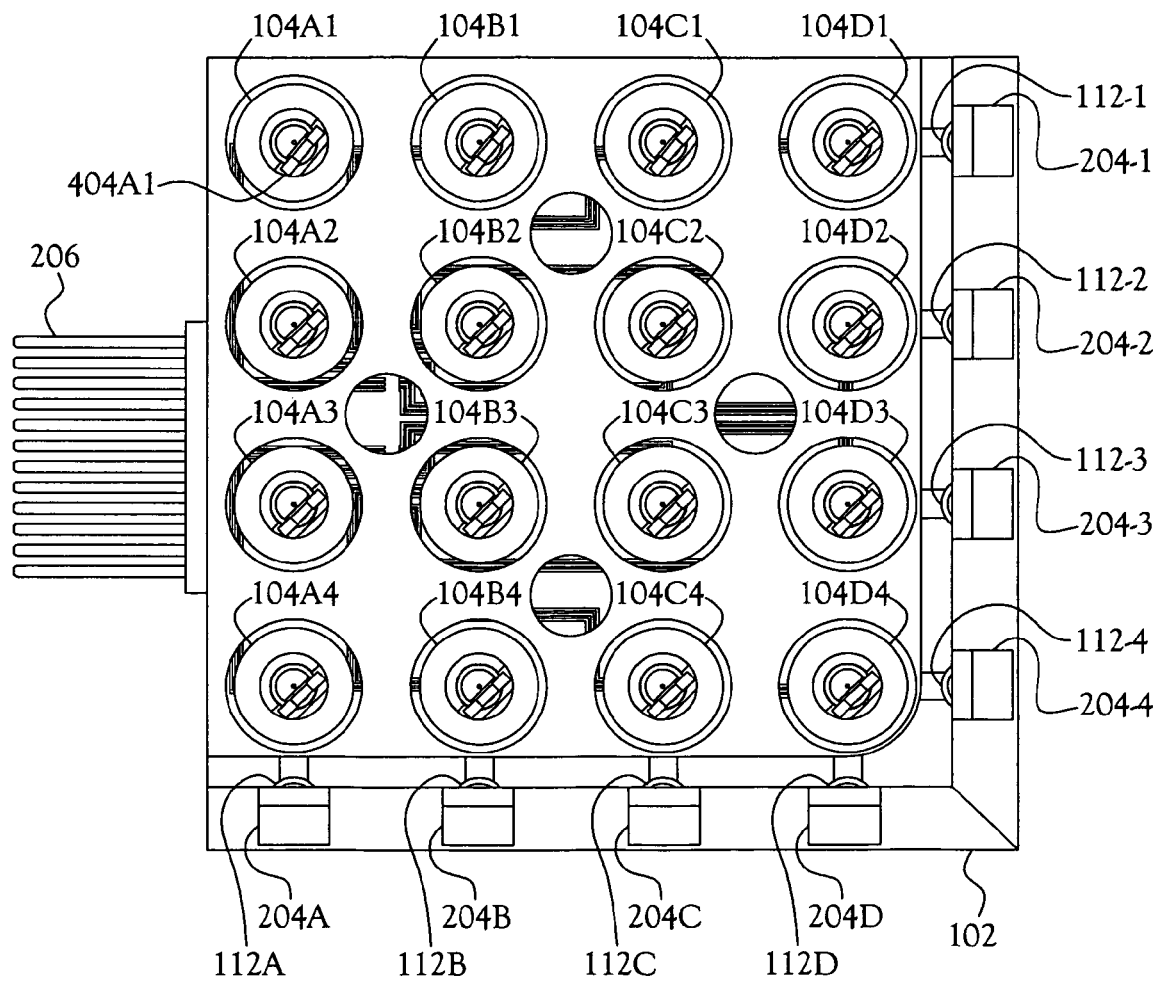
FIG. 4 is a top view of one embodiment of the 4×4 switch without the cover.
Figure 5:
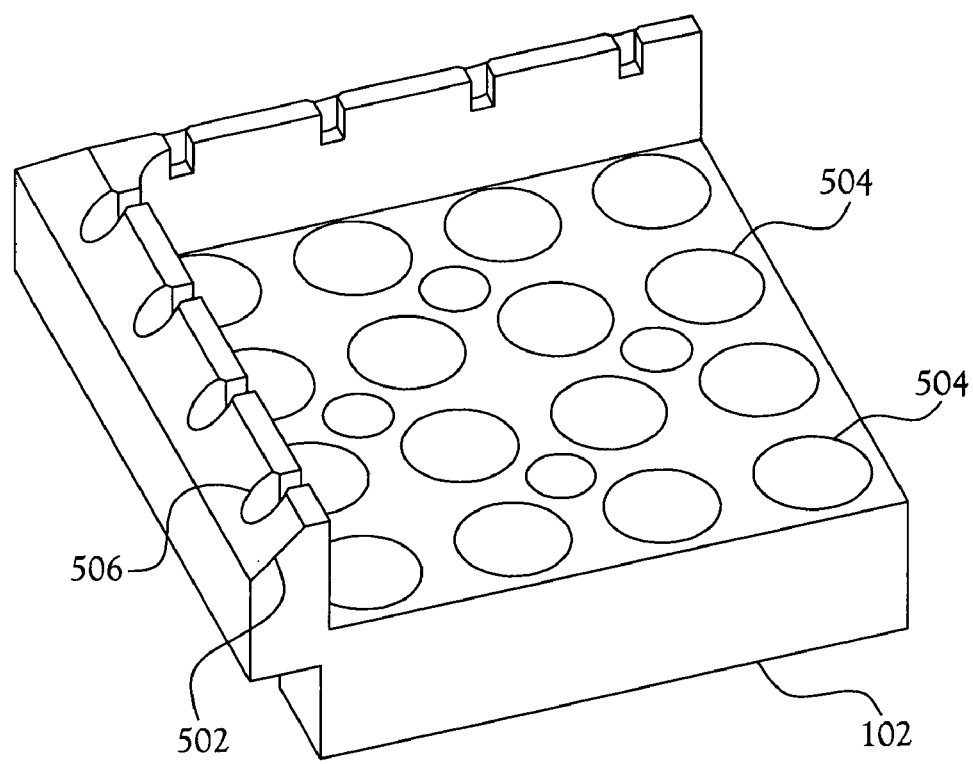
FIG. 5 is a perspective view of one embodiment of a switch body.

The switch body 102 is also adapted to receive and secure the collimators 112. The switch body 102 has a surface 502 canted at 45 degrees to which front surface mirrors 204 are secured. FIG. 4 illustrates the configuration of the mirrors 204 and the actuators 104. FIG. 5 illustrates the configuration of one embodiment of the switch body 102.

Figure 3:
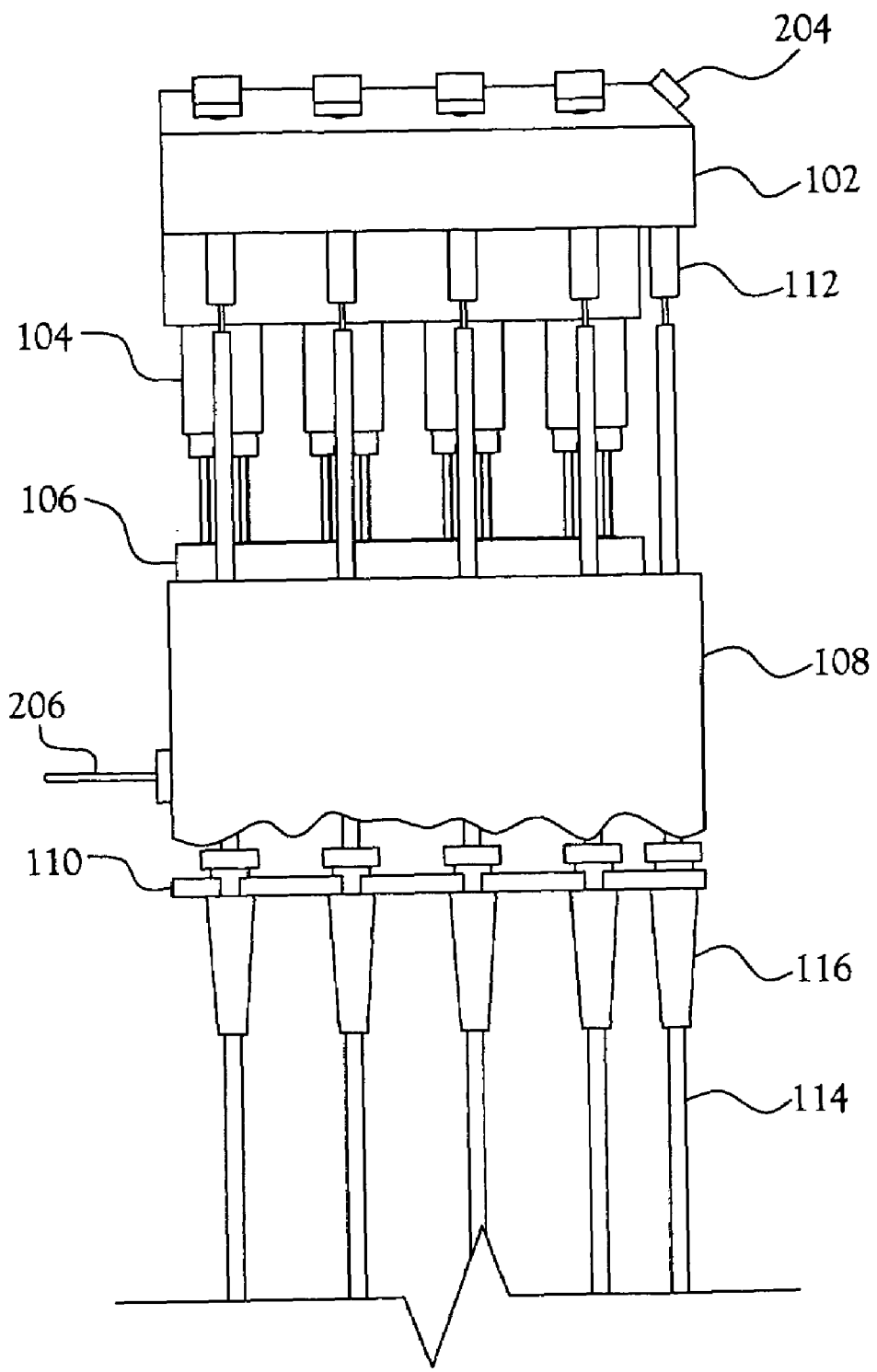
FIG. 3 is a side view of one embodiment of the 4×4 switch without the cover.

FIG. 3 illustrates a side view of one embodiment of a 4×4 switch 100 without the cover 202 in place. The collimators 112 are secured to the switch body 102 and the fiber optic pigtails 114 extend through the gel block 108 and the bottom cover plate 110. Each fiber optic pigtails 114 has a resilient strain relief 116 to protect the pigtail 114 where it passes through the bottom cover plate 110. The cable assembly 206 extends from the circuit board 106 and runs alongside the gel block 108.

FIG. 4 illustrates a top view of one embodiment of the 4×4 switch 100 without the cover 202 in place. FIG. 5 illustrates a perspective view of one embodiment of a switch body 102. The collimators 112 are received and secured along two sides of the switch body 102 in openings 506 spaced along the canted surface 502 of the switch body 102. The mirrors 204 are secured over the openings 506 and reflect an optical light beam between the associated collimator 112 and an actuator mirror 404. The actuators 104 are arranged in a rectilinear array, with the rows and columns in line with the optical signals emitted by the associated collimators 112 and reflected by the associated mirrors 104 such that the actuator mirrors 404 reflect the optical signal with the actuator mirror 404 is in the extended position.

The illustrated 4×4 switch 100 operates by a light beam being emitted from a collimator 112A, reflected from its associated mirror 204A, reflected from one of the four mirrors 404 moved into the extended position by one of the actuators 104A1, 104A2, 104A3, 104A4, reflected from the correspond mirror 204-1, 204-2, 204-3, 204-4, and into the associated collimator 112. Accordingly, the optical signal carried by an optical light beam emitted from the collimator 112A is directed to any one of the four output collimators 112-1, 112-2, 112-3, 112-4. The same is true of the other three input collimators 112B, 112C, 112D. The 4×4 array configuration of the actuators 104 allows all four of the input collimators 112A, 112B, 112C, 112D to be routed, in any permutation, to the four output collimators 112-1, 112-2, 112-3, 112-4. For a 4×4 switch 100, there are a total of 24 different permutations, that is, there are 24 different ways the input signals can be routed to the output.

For example, to route the optical signal from input collimator 112B to output collimator 112-3, the actuators 104B4, 104C3, 104C4 in the optical path are operated to the retracted position and actuator 104B3 is operated to the extended position. The position of the other actuators 104A1, 104A2 along the line of the reflected optical signal from input collimator 112A does not affect the routing of the signal from the collimator 112A; however, if any of their mirrors 404 are in the extended position, the light path from the other collimator 112A may be affected. In one embodiment, the mirror 404A1 is left in the extended position, and in another embodiment, the actuator 104A1 is replaced with a device with a mirror 404A1 positioned in the extended position, because this mirror 404A1 cannot interfere with any other light path.

FIG. 5 illustrates the optical body, or bench, 102 with the openings 504 in which the actuators 104 are received and secured. The openings 504 are positioned in a 4×4 array. The actuators 104, in one embodiment, are secured in the openings 504 by an adhesive disposed between the body of the actuator 104 and the switch body 102. Before the adhesive is cured, the actuator 104 is aligned. In a similar manner, the collimators 112 are secured in the openings 502 by an adhesive disposed between the body of the collimator 112 and the switch body 102. Before the adhesive is cured, the collimator 112 is aligned. The canted surface 502 is precisely machined to a 45 degree angle, thereby allowing the mirrors 204 to accurately reflect the optical signals between the collimators 112 and the actuators 104.

The optical bench 102 is in the general shape of a table with two side-walls extending above the upper surface of the table. That is, the bench 102 has a base with two perpendicular side-walls. Spaced along the sides of the bench 102 walls are openings into which the collimators 112 fit with clearance for an adhesive. Spaced along the top of the bench 102 walls are slots 506 through which the optical paths travel between the collimators 112 and actuators 104. Those skilled in the art will recognize that the slots can be rectangular as illustrated or of any other shape, such as a V-shaped groove or even a drilled opening, without departing from the spirit and scope of the present invention. The illustrated configuration of the optical bench 102 provides for a short free space distance for the optical signal to travel, which, for fiber optics, minimizes signal degradation.

The two side-walls of the optical bench 102 have chamfers 502 between their side surfaces and top surfaces. In the illustrated embodiment, each chamfer 502 is at a precise 45° angle. Mirrors 204 are reflectors attached to the surfaces 502 with a reflective surface positioned to reflect the optical signal from or to the associated collimator 112. In one embodiment, the mirrors 204 are front-sided mirrors having a reflective surface on the surface of the mirror 204 facing the optical bench 102 surfaces 502. The mirrors 204 in one embodiment are glass with a reflective surface. In another embodiment, the mirrors 204 are metal, such as Kovar, with a reflective surface. In one embodiment an adhesive (not illustrated) is used to affix the mirrors 204 to the optical bench 102.

In one embodiment the bench 102 is made of Kovar metal, which has a coefficient of thermal expansion similar to that of glass. The mirrors 204 are fixed to the bench 102 with an adhesive. In one embodiment the adhesive has a coefficient of thermal expansion similar to that of the mirrors 204 and the bench 102. Likewise, the actuators 104 and collimators 112 are fabricated of materials with a coefficient of thermal expansion similar to that of the bench 102. In one embodiment the mirrors 204 are glass plates with a front side reflective coating responsive to the frequencies passed by the collimators 112. In another embodiment, the mirrors are flat plates with a front side reflective coating, and the plates have a coefficient of thermal expansion similar to that of the optical bench 102.

The precise alignment of the collimators 212 to the mirrors 204 is critical in fiber optics. Any misalignment can result in an attenuation of the signal or the loss of the signal. By matching the coefficient of thermal expansion of the individual components and adhesives, the components of the switch assembly 100 remain in alignment over a wide temperature range such that the optical path does not suffer degradation as the temperature varies. In one embodiment, the temperature range is from −40° to +85° Centigrade. In another embodiment, the transition point of the adhesive is outside the operating temperature range, which enhances the dimensional stability of the switch assembly 100. In one embodiment, keeping the transition point outside the operating range is accomplished by using fillers. In still another embodiment, the adhesive has limited shrinkage, which can be accomplished with a filler. Further, the adhesive can be cured in place, which aids in the active alignment of the collimators 212 and actuators 104.

The collimators 212 and the actuators 104 are secured to the bench 102 by an adhesive. The adhesive fills a gap between the collimators 212 and the optical bench 102. The adhesive fills a gap between the actuators 104 and the optical bench 102. The gaps filled by the adhesive permit the collimators 212 and the actuators 104 to be moved relative to the bench 102 during positioning and alignment before the adhesive is cured In one embodiment the adhesive is a quick curing adhesive blended with amorphous silica spheres of a selected diameter. The adhesive is compressed between the mirrors 204 and the optical bench 102, with the spheres forming a monolayer, which results in dimensional stability when the adhesive is cured. In another embodiment the adhesive is Dymax OP66LS, which has a coefficient of thermal expansion similar to that of the bench 102 such that the collimators 212 remain in alignment as the temperature varies within the operating range of the switch assembly 100.

Figure 6:
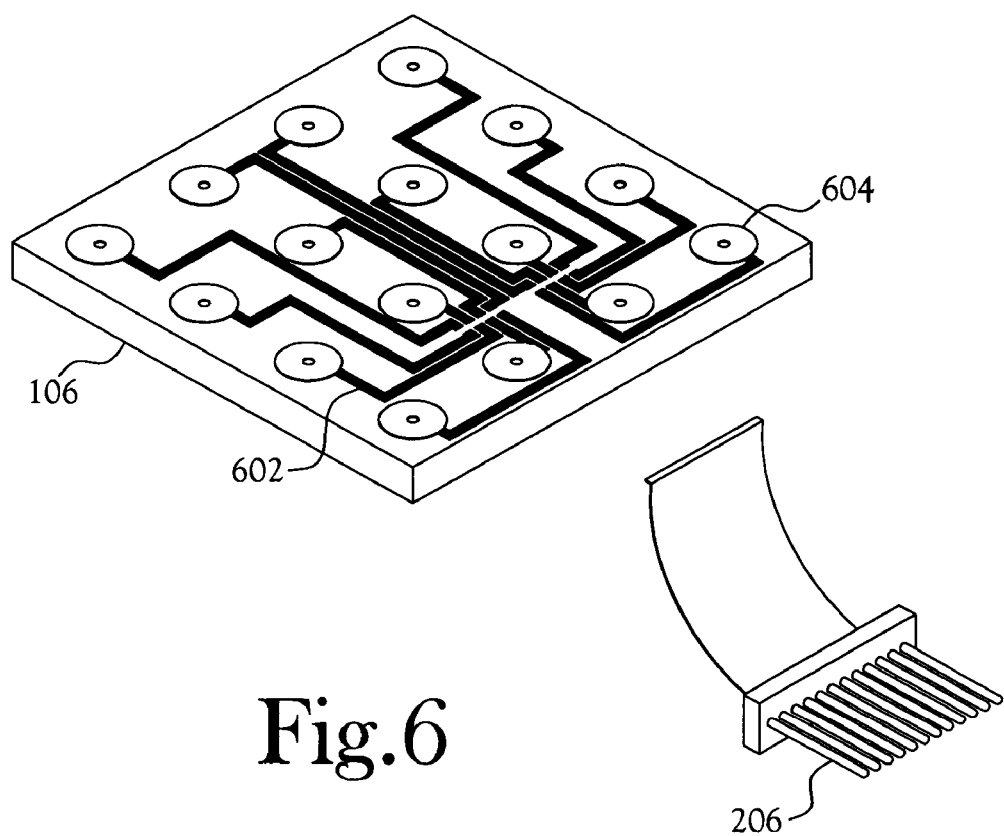
FIG. 6 is a perspective view of one embodiment of a circuit board and cable assembly.
Figure 7:
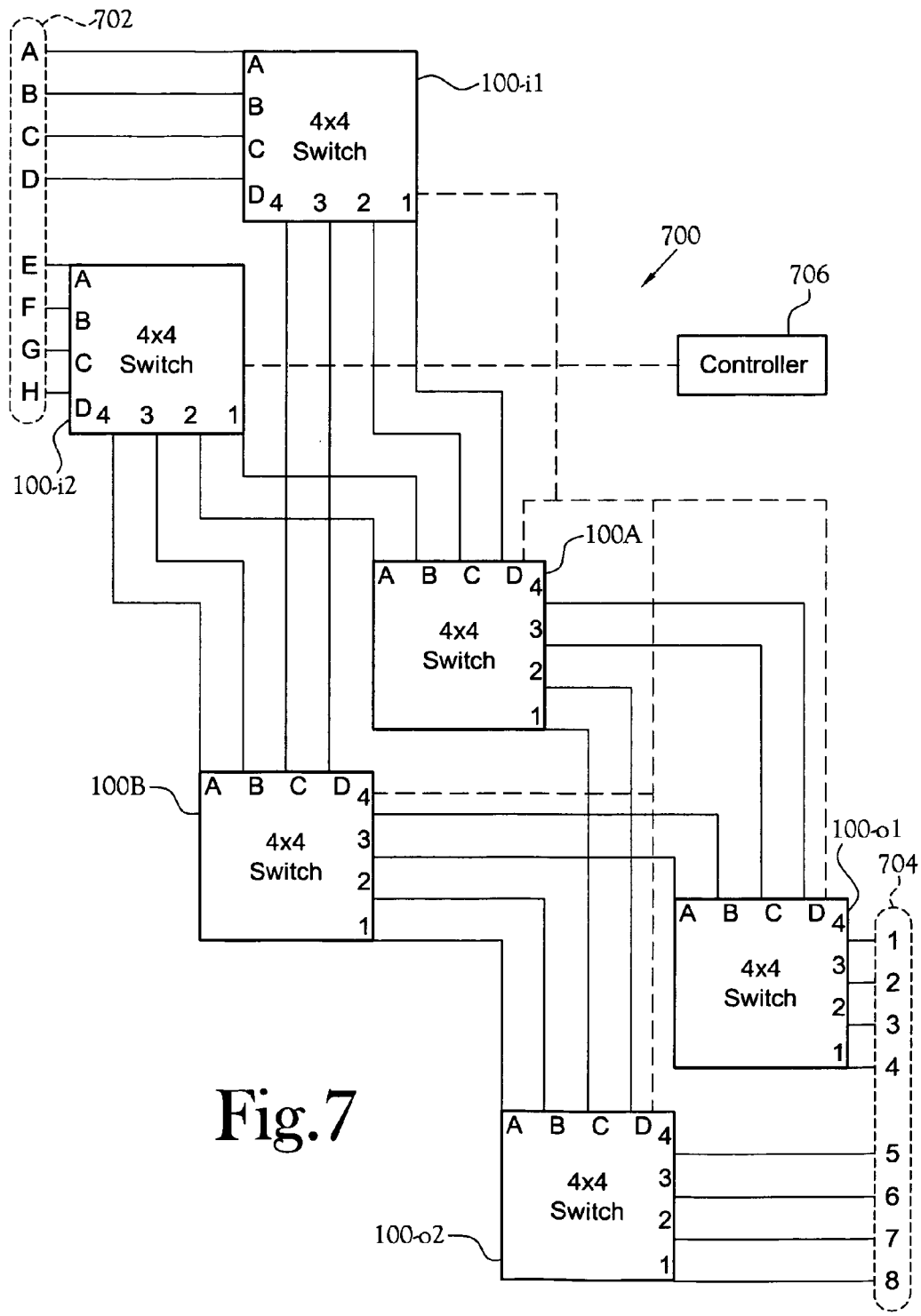
FIG. 7 is a block diagram of one embodiment of an 8×8 switch array assembled with a plurality of 4×4 switches.

FIG. 6 illustrates a perspective view of one embodiment of a circuit board 106 and cable assembly 206. In one embodiment, the circuit board 106 includes circuit elements that receive a signal containing switch position information and apply the appropriate signals to the actuators 108 to effectuate the selected switch position. In another embodiment, the circuit board 106 includes conductive traces that provide an electrical connection between the electrical leads extending from the actuator 104 and the FIG. 7 illustrates a block diagram of one embodiment of an 8×8 switch array 700 assembled with a plurality of 4×4 switches 100. The illustrated 8×8 switch array 700 requires only six 4×4 switches 100. Illustrated generally in FIG. 7 are the four inputs (A, B, C, D) of each 4×4 switch 100 and the four outputs (1, 2, 3, 4) of each 4×4 switch 100.

A limitation in constructing large switch bodies 102, such as would be needed for a single switch body 102 to handle an array of eight inputs by eight outputs, is that the free space distance that an optical signal can travel is limited based on signal dispersion and signal losses. By using the 4×4 switch 100 as a basic building block, it is possible to construct large switch arrays 700, 800, 900, 1000, 1100 with minimal losses. Those skilled in the art will recognize that switches other than with 4×4 arrays, for example, 3×3 and 3×4, can be used without departing from the spirit and scope of the present invention.

The 8×8 switch array 700 has eight (A–H) inputs 702 that can be routed to any permutation of eight (1–8) outputs 702. For the 8×8 switch array 700, the eight inputs 702 can be routed 40,320 different ways to the eight outputs 704. The eight inputs 702 are split between two input 4×4 switches 100-*i*1, 100-*i*2. The outputs of each input 4×4 switch 100-*i*1, 100-*i*2 are split between the two intermediate 4×4 switches 100-A, 100-B. The outputs of intermediate 4×4 switch 100-A, 100-B are split between the two output 4×4 switches 100-*o*1, 100-*o*2.

As an example of a possible routing, if input B 702 is desired to be routed to output 6 704, the input 4×4 switch 100-*i*1 routes its input B to output 3, the intermediate 4×4 switch 100-B routes its input D to output 2, and the output 4×4 switch 100-*o*2 routes its input B to output 3. Table 1 illustrates an example of one routing of the eight inputs 702 to one permutation of the eight outputs 704.

TABLE 1

| Input 702 | Input | Output | Input | Output | Input | Output | Output 702 |
|---|---|---|---|---|---|---|---|
| A | 100-i1 A | 100-i1 1 | 100-A D | 100-A 2 | 100-o2 D | 100-o2 3 | 6 |
| B | 100-i1 B | 100-i1 2 | 100-A C | 100-A 1 | 100-o2 C | 100-o2 2 | 7 |
| C | 100-i C | 100-i1 3 | 100-B D | 100-B 1 | 100-o2 A | 100-o2 1 | 8 |
| D | 100-i1 D | 100-i1 4 | 100-B C | 100-B 4 | 100-o1 B | 100-o1 1 | 1 |
| E | 100-i2 A | 100-i2 1 | 100-A B | 100-A 4 | 100-o1 D | 100-o1 3 | 2 |
| F | 100-i2 B | 100-i2 2 | 100-A A | 100-A 3 | 100-o1 C | 100-o1 2 | 3 |
| G | 100-i2 C | 100-i2 3 | 100-B B | 100-B 3 | 100-o1 A | 100-o1 1 | 4 |
| H | 100-i2 D | 100-i2 4 | 100-B A | 100-B 2 | 100-o2 B | 100-o2 4 | 5 |

In the example shown in Table 1, the intermediate 4×4 switch 100-A has four actuators 104A3, 104B4, 104C1, 104D2 in the extended position. In this example, only the actuators 104 in the optical path between the associated input and output collimators 112 are required to be in the retracted position.

The 8×8 switch array 700 includes a controller 706 that provides electrical control signals to each of the 4×4 switches 100-*i*1, 100-*i*2, 100-A, 100-B, 100-*o*1, 100-*o*2. The controller 706, in one embodiment, receives commands to route the various optical inputs 702 to specific optical outputs 704. In one embodiment, the controller 706 includes a computer executing software. The computer controls an output module that operates the appropriate actuators 104 in each switch 100-*i*1, 100-*i*2, 100-A, 100-B, 100-*o*1, 100-*o*2. In another embodiment, the controller 706 includes analog elements that provide the control signals to operate the appropriate actuators 104 in each switch 100-*i*1, 100-*i*2, 100-A, 100-B, 100-*o*1, 100-*o*2.

Figure 8:
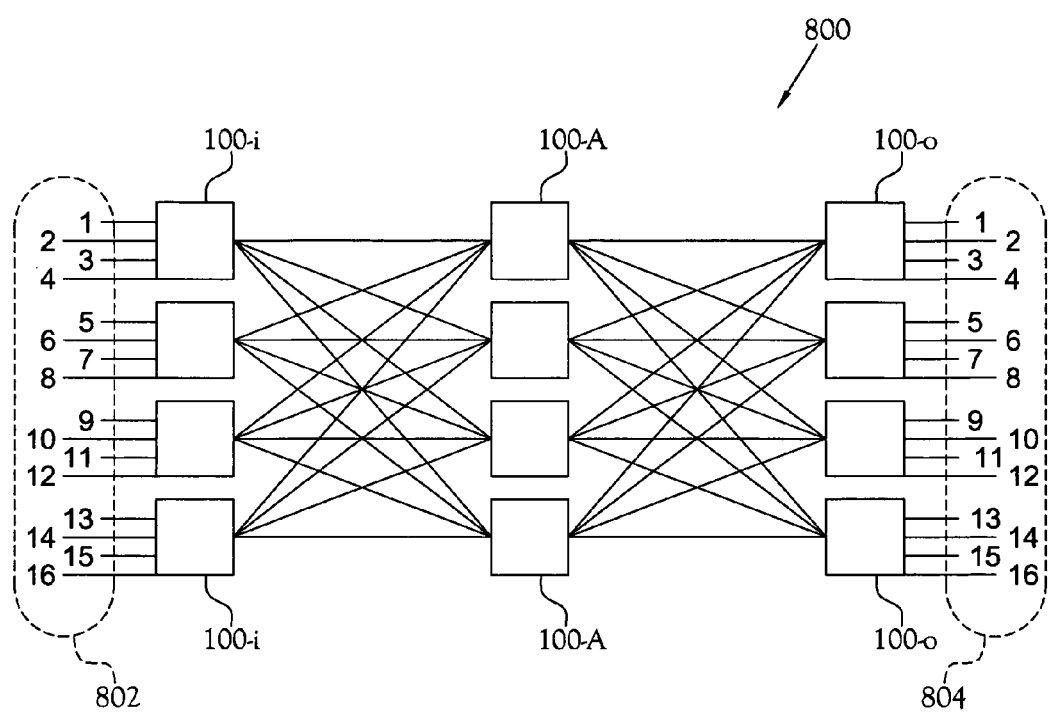
FIG. 8 is a block diagram of one embodiment of an 16×16 switch array assembled with a plurality of 4×4 switches.

FIG. 8 illustrates a block diagram of one embodiment of an 16×16 switch array 800 assembled with a plurality of 4×4 switches 100. The 16×16 switch array 800 has sixteen (1–16) inputs 802 that can be routed to any permutation of sixteen (1–16) outputs 802. For the 16×16 switch array 800, the sixteen inputs 802 can be routed over 20 trillion different ways to the sixteen outputs 804. The sixteen inputs 802 are split between four input 4×4 switches 100-*i*. The illustrated 16×16 switch array 800 requires only twelve 4×4 switches 100. Although a controller 706 is not illustrated in FIG. 8, in one embodiment, such a controller 706 is understood to be connected to each of the 4×4 switches 100.

The outputs of each input 4×4 switch 100-*i* are split between the four intermediate 4×4 switches 100-A. In the illustrated embodiment, each output of each input 4×4 switch 100-*i* is connected to a different one of the four intermediate 4×4 switches 100-A. The outputs of intermediate 4×4 switch 100-A are split between the four output 4×4 switches 100-*o*. In the illustrated embodiment, each output of each intermediate 4×4 switch 100-A is connected to a different one of the four output 4×4 switches 100-*o*. With the illustrated configuration, any one of the sixteen inputs 802 can be routed to any one of the sixteen outputs 804.

To reduce the complexity of the illustration, the connections between the four input 4×4 switches 100-*i* and the four intermediate 4×4 switches 100-A and the connections between the four intermediate 4×4 switches 100-A and the four output 4×4 switches 100-*o* are illustrated simply by showing the path between the switches 100-*i*, 100-A, 100-*o*.

FIG. 8 illustrates one embodiment of a switch array in which the number of intermediate switches 100-A is equal to the number of outputs from each of the input switches 100-*i*. Those skilled in the art will recognize that the configuration illustrated in FIG. 8 is readily adapted for use with other N×N switches, for example, 3×3 or 5×5 switches.

An efficient switch array design is when that the number of intermediate switches 100-A equals the number of outputs of each input switch 100-*i* for switches that all have the same number of inputs and outputs, for example 4×4 optical switches 100. If non-identical switches are used, other configurations are possible, although possible with less efficient use of the available optical ports.

In another embodiment, the number of intermediate switches 100-A is less than the number of outputs of each input switch 100-*i*. For example, a 12×12 switch array assembled with 4×4 optical switches 100 has three input switches 100-*i*, three intermediate switches 100-A, and three output input switches 100-*o*. This embodiment has each of the three intermediate switches 100-A receiving an input from each of the three input switches 100-*i* with the fourth input to each intermediate switch 100-A connected to one of the remaining outputs of one of the three input switches 100-*i*. That is, in this example, the fourth output from each input switch 100-*i* is connected to one of the three intermediate switches 100-A. FIG. 7 illustrates such an embodiment in which more than one output of each of the input switches 100-*i*1, 100-*i*2 are connected to the same intermediate switch 100-A.

Figure 9:
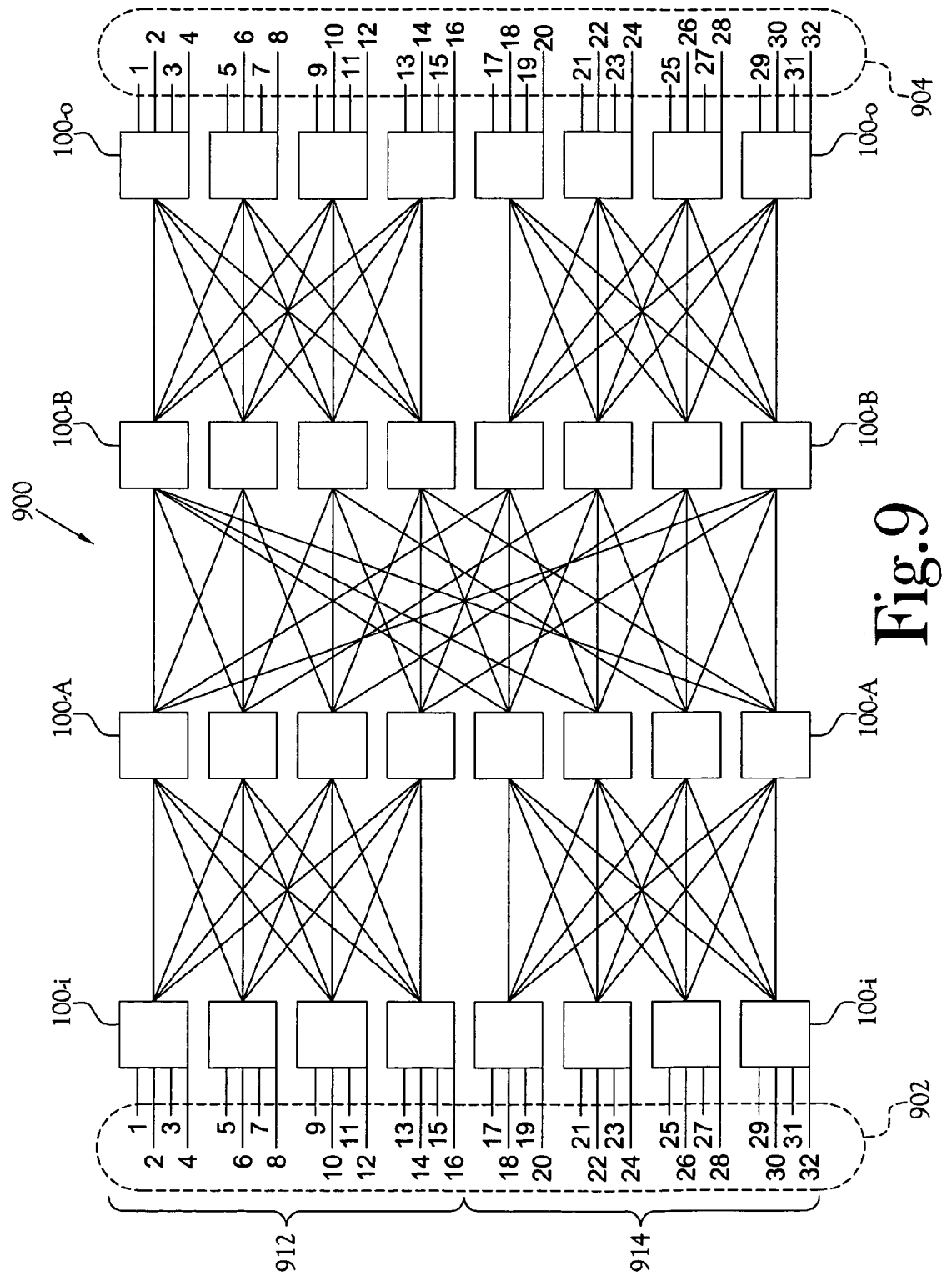
FIG. 9 is a block diagram of one embodiment of an 32×32 switch array assembled with a plurality of 4×4 switches.

FIG. 9 illustrates a block diagram of one embodiment of an 32×32 switch array 900 assembled with a plurality of 4×4 switches 100. The 32×32 switch array 900 has thirty-two (1–32) inputs 902 that can be routed to any permutation of thirty-two (1–32) outputs 902. With the illustrated configuration, any one of the thirty-two inputs 902 can be routed to any one of the thirty-two outputs 904. The illustrated 32×32 switch array 900 requires only thirty-two 4×4 switches 100. Although a controller 706 is not illustrated in FIG. 9, in one embodiment, such a controller 706 is understood to be connected to each of the 4×4 switches 100.

The thirty-two inputs 902 are split between eight input 4×4 switches 100-*i*. The thirty-two inputs 902, the eight input 4×4 switches 100-*i*, the eight first intermediate 4×4 switches 100-A, the eight second intermediate 4×4 switches 100-B, and the thirty-two outputs 904 are split into two groups, or sets, 912, 914. The first group 912 includes a group of inputs 902 that connect to a group of four input 4×4 switches 100-*i* that have their outputs split between a group of four first intermediate 4×4 switches 100-A. The second group 914 of inputs likewise connect to a group of four input 4×4 switches 100-*i* that have their outputs split between a second group of four first intermediate 4×4 switches 100-A. A first group 912 of four second intermediate 4×4 switches 100-B have their outputs split between a group 912 of four output 4×4 switches 100-*o*. A second group 914 of four second intermediate 4×4 switches 100-B have their outputs split between a second group 914 of four output 4×4 switches 100-*o*. The connections between the groups 912, 914 of four input 4×4 switches 100-*i* and the groups 912, 914 of four first intermediate 4×4 switches 100-A and the connections between the groups 912, 914 of four second intermediate 4×4 switches 100-B and the groups 912, 914 of four output 4×4 switches 100-*o* are made in a manner similar to the connections between the switches 100-*i*, 100-A, 100-*o* in the 8×8 switch array 800.

In order to allow any one of the thirty-two inputs 902 to connect to any one of the thirty-two outputs 904, at least one of the connections between the outputs of each of the first intermediate 4×4 switches 100-A and the inputs of the second intermediate switches 100-B cross the boundary of the two groups 912, 914. At least one output of each of the first intermediate 4×4 switches 100-A is connected to an input of one of the second intermediate switches 100-B that is in the other group 912, 914 of second intermediate switches 100-B.

Figure 10:
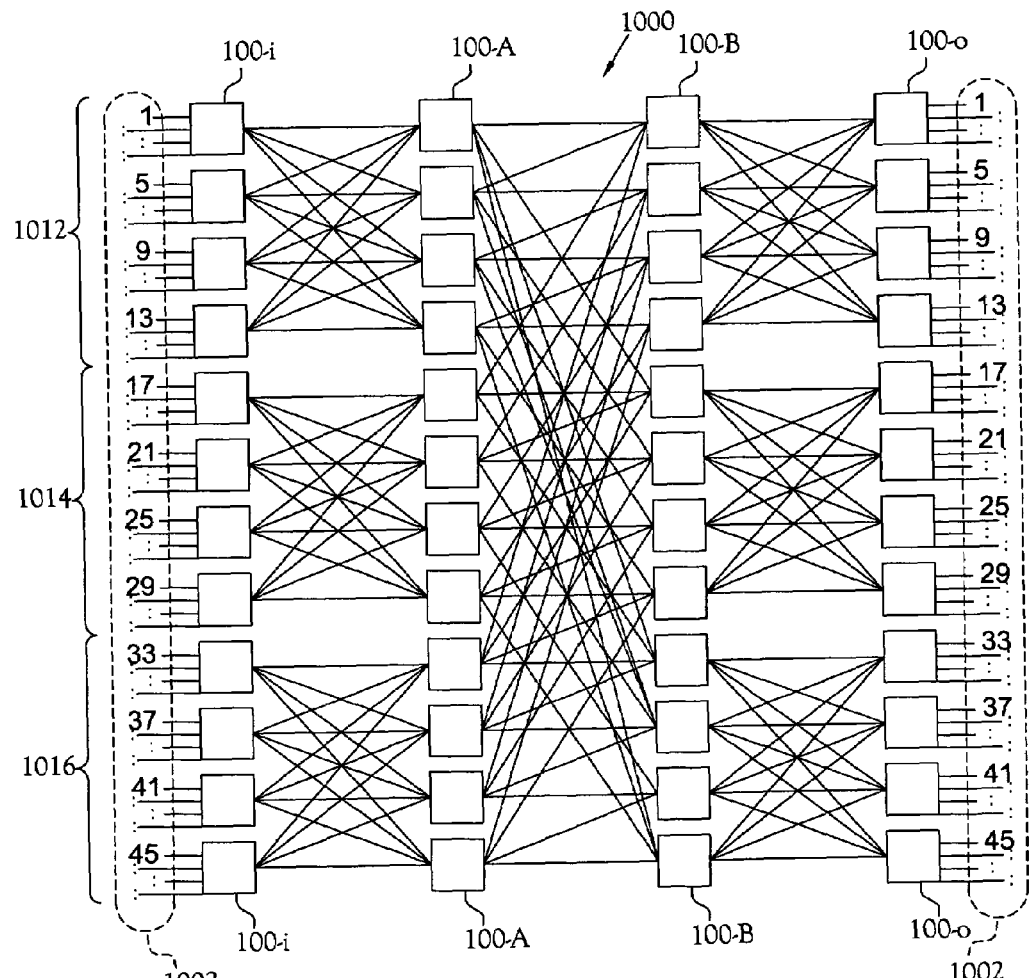
FIG. 10 is a block diagram of one embodiment of an 48×48 switch array assembled with a plurality of 4×4 switches.

FIG. 10 illustrates a block diagram of one embodiment of an 48×48 switch array 1000 assembled with a plurality of 4×4 switches 100. The 48×48 switch array 1000 has forty-eight (1–48) inputs 1002 that can be routed to any permutation of forty-eight (1–48) outputs 1002. With the illustrated configuration, any one of the forty-eight inputs 1002 can be routed to any one of the forty-eight outputs 1004. The illustrated 48×48 switch array 1000 requires only forty-eight 4×4 switches 100. Although a controller 706 is not illustrated in FIG. 10, in one embodiment, such a controller 706 is understood to be connected to each of the 4×4 switches 100.

The forty-eight inputs 1002 are split between twelve input 4×4 switches 100-*i*. The forty-eight inputs 1002, the twelve input 4×4 switches 100-*i*, the twelve first intermediate 4×4 switches 100-A, the twelve second intermediate 4×4 switches 100-B, and the forty-eight outputs 1004 are split into three groups, or sets, 1012, 1014, 1016. The first group 1012 includes a group of inputs 1002 that connect to a group of four input 4×4 switches 100-*i* that have their outputs split between a group of four first intermediate 4×4 switches 100-A. The second group 1014 and third group 1016 of inputs likewise each connect to a group of four input 4×4 switches 100-*i* that have their outputs split between a second and third group, respectively, of four first intermediate 4×4 switches 100-A. In a similar manner to the inputs 1002, the outputs 1004 come from three groups 1012, 1014, 1016 of output 4×4 switches 100-*o* that are connected to corresponding groups of second intermediate 4×4 switches 100-B. A first group 1012 of four second intermediate 4×4 switches 100-B have their outputs split between a group of four output 4×4 switches 100-*o*. Likewise, second and third groups 1014, 1016 of four second intermediate 4×4 switches 100-B have their outputs split between second and third groups 1014, 1016 of four output 4×4 switches 100-*o*.

In order to allow any one of the forty-eight inputs 1002 to connect to any one of the forty-eight outputs 1004, the connections between the first intermediate 4×4 switches 100-A and the second intermediate switches 100-B cross the boundary of the three groups 1012, 1014, 1016. At least one output of each of the first intermediate 4×4 switches 100-A is connected to an input of one of the second intermediate switches 100-B that is in the other group 1012, 1014, 1016 of second intermediate switches 100-B. That is, with respect to the optical connections between the outputs of the twelve first intermediate 4×4 switches 100-A and the inputs to the twelve second intermediate 4×4 switches 100-B, each first intermediate 4×4 switch 100-A has one output connected to at least one second intermediate 4×4 switch 100-B in each of the three groups 1012, 1014, 1016 of the second intermediate 4×4 switches 100-B.

Figure 11:
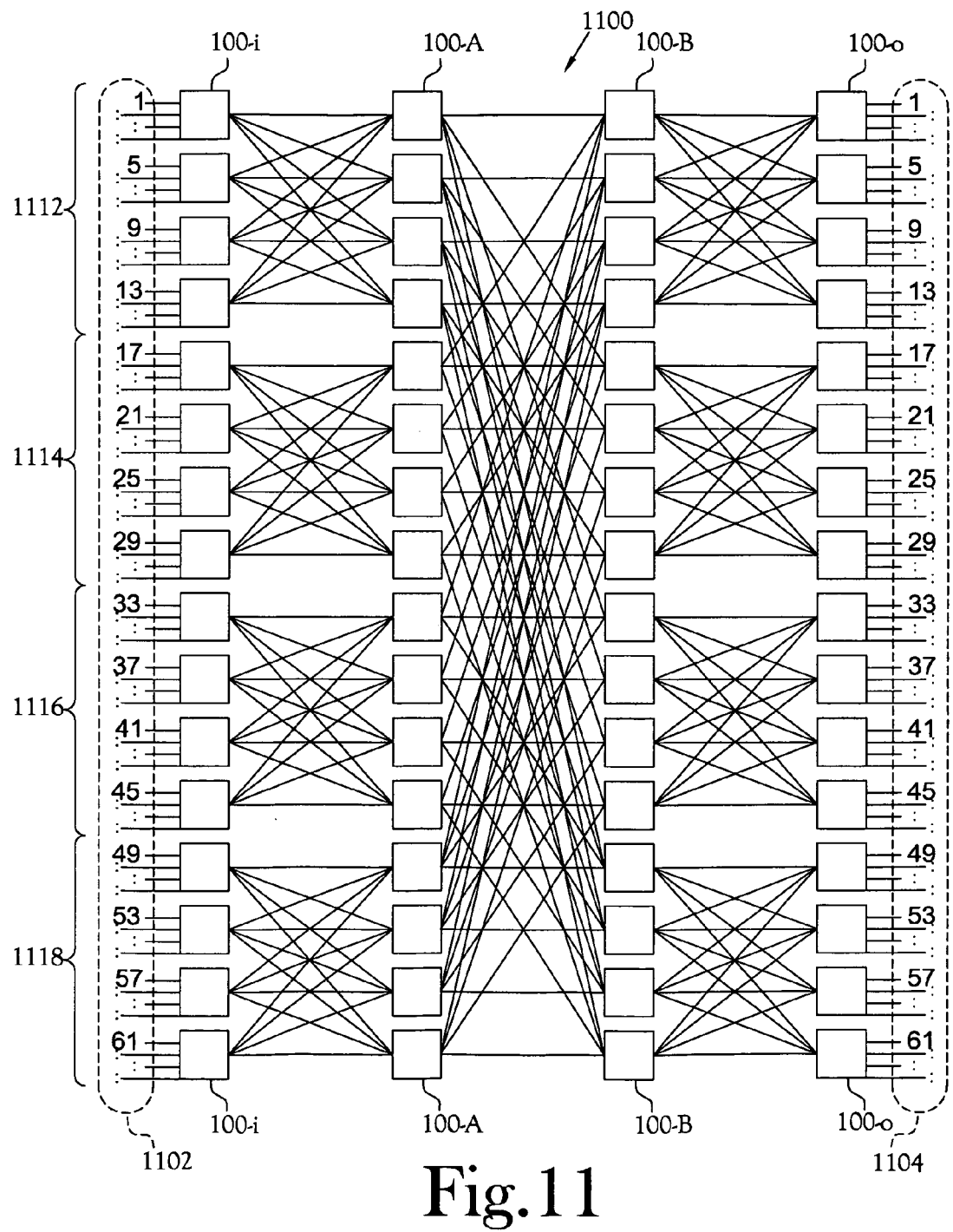
FIG. 11 is a block diagram of one embodiment of an 64×64 switch array assembled with a plurality of 4×4 switches.

FIG. 11 illustrates a block diagram of one embodiment of an 64×64 switch array 1100 assembled with a plurality of 4×4 switches 100. The 64×64 switch array 1100 has sixty-four (1–64) inputs 1102 that can be routed to any permutation of sixty-four (1–64) outputs 1102. With the illustrated configuration, any one of the sixty-four inputs 1102 can be routed to any one of the sixty-four outputs 1104. The illustrated 64×64 switch array 1100 requires only sixty-four 4×4 switches 100. Although a controller 706 is not illustrated in FIG. 11, in one embodiment, such a controller 706 is understood to be connected to each of the 4×4 switches 100.

The sixty-four inputs 1102 are split between sixteen input 4×4 switches 100-*i*. The sixty-four inputs 1102, the sixteen input 4×4 switches 100-*i*, the sixteen first intermediate 4×4 switches 100-A, the sixteen second intermediate 4×4 switches 100-B, and the sixty-four outputs 1104 are split into four groups, or sets, 1112, 1114, 1116, 1118. The first group 1112 includes a group of sixteen inputs 1102 that connect to a group of four input 4×4 switches 100-*i* that have their outputs split between a group of four first intermediate 4×4 switches 100-A. The second, third, and fourth groups 1114, 1116, 1118 of inputs likewise each connect to a group of four input 4×4 switches 100-*i* that have their outputs split between a second, third, and fourth group, respectively, of four first intermediate 4×4 switches 100-A. In a similar manner to the inputs 1002, the outputs 1004 come from four groups 1112, 1114, 1116, 1118 of output 4×4 switches 100-*o* that are connected to corresponding groups of second intermediate 4×4 switches 100-B. A first group 1012 of four second intermediate 4×4 switches 100-B have their outputs split between a group of four output 4×4 switches 100-*o*. Likewise, second, third, and fourth groups 1114, 1116, 1118 of four second intermediate 4×4 switches 100-B have their outputs split between second, third, and fourth groups 1114, 1116, 1118 of four output 4×4 switches 100-*o*.

In order to allow any one of the sixty-four inputs 1102 to connect to any one of the sixty-four outputs 1104, the connections between the first intermediate 4×4 switches 100-A and the second intermediate switches 100-B cross the boundary of the four groups 1112, 1114, 1116, 1118. One output of each of the first intermediate 4×4 switches 100-A is connected to an input of one of the second intermediate switches 100-B that is in the other groups 1112, 1114, 1116, 1118 of second intermediate switches 100-B. That is, with respect to the optical connections between the outputs of the sixteen first intermediate 4×4 switches 100-A and the inputs to the sixteen second intermediate 4×4 switches 100-B, each first intermediate 4×4 switch 100-A has one output connected to one second intermediate 4×4 switch 100-B in each of the four groups 1112, 1114, 1116, 1118 of the second intermediate 4×4 switches 100-B.

Figure 12:
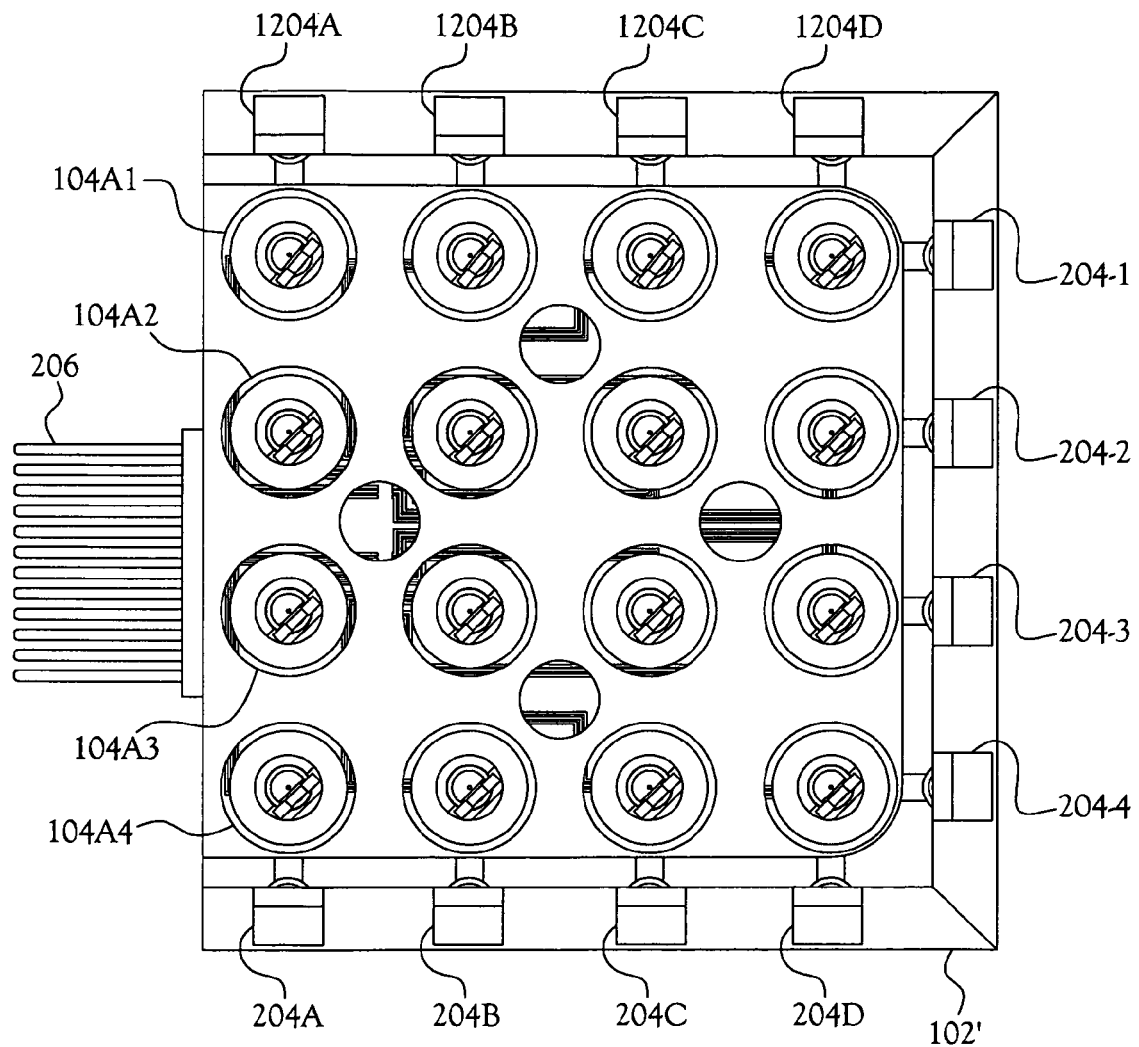
FIG. 12 is a top view of one embodiment of a 4×4 switch with a failsafe option.

FIG. 12 illustrates a top view of one embodiment of a 4×4 switch 100' with a failsafe option. In this embodiment, each input collimator 204A, 204B, 204C, 204D has an associated failsafe output collimator 1204A, 1204B, 1204C, 1204D positioned such that with no intervening actuator 104 in an extended position, an optical signal from an input collimator 204A, 204B, 204C, 204D passes to a failsafe output collimator 1204A, 1204B, 1204C, 1204D. The failsafe switch 100' requires that all actuators 104 be maintained in the retracted position unless the actuator 104 is required to be in the extended position to reflect an optical signal to an output collimator 204-1, 204-2, 204-3, 204-4. A failure of an actuator 104 to reach the extended position results in the optical signal from the associated input collimator 204A, 204B, 204C, 204D to travel to the failsafe collimator 1204A, 1204B, 1204C, 1204D, where it can, in one embodiment, be otherwise routed, or in another embodiment, be detected and cause some corrective action to be taken.

In another embodiment, when a switch 100' is to have its state changed, each actuator 104 is first moved to the retracted position, thereby causing the signal from each input collimator 204A, 204B, 204C, 204D to be sensed by the associated failsafe collimator 1204A, 1204B, 1204C, 1204D. If no signal is sensed, then the failure of an actuator 104 to retract is indicated. After all actuators 104 are retracted, the appropriate actuators 104 are then moved to the extended position. The failsafe collimator 1204A, 1204B, 1204C, 1204D are then checked to determine if any are receiving an optical signal, thereby indicating that an actuator 104 has failed to move to the extended position.

The apparatus includes various functions.

The function of switching is implemented, in various embodiments, by the optical switch 100, which includes a plurality of collimators 112 and actuators 104 arranged such that the actuators 104 direct an optical signal from an input collimator 112A to 112B to a selected output collimator 112-1 to 112-4. In another embodiment, the function of switching includes a group of failsafe collimators 1204 positioned to receive an optical signal for a collimator 112 that fails to move to the extended position.

For a switch array 700, 800, 900, 1000, 1100, the function of accepting a plurality of optical inputs is implemented, in various embodiments, by the input switch assemblies **100-*i* of a switch array 700, 800, 900, 1000, 1100. For a switch array 700, 800, 900, 1000, 1100, the function of transmitting a plurality of optical outputs is implemented, in various embodiments, by the output switch assemblies 100-*o* of a switch array 700, 800, 900, 1000, 1100**.

For a switch array 700, 800, 900, 1000, 1100, the function of routing a plurality of optical inputs to a plurality of optical outputs is implemented, in various embodiments, by the switch assemblies 100 of the switch array 700, 800, 900, 1000, 1100 individually and collectively routing the optical inputs to optical outputs.

For a switch 100, 100', the function of detecting failure of an actuator is implemented, in one embodiment, by the failsafe collimators 1204A, 1204B, 1204C, 1204D positioned opposite the input collimators 204A, 204B, 204C, 204D.

For a switch array 700, 800, 900, 1000, 1100, the function of detecting failure of a switch **100-*i*, 100-A, 100-B, 100-*o* is implemented, in one embodiment, by the switches 100' being failsafe switches including failsafe collimators 1204A, 1204B, 1204C, 1204D positioned opposite the input collimators 204A, 204B, 204C, 204D. In this embodiment, failure of an actuator 104 in a switch 100' to move to the extended position results in the associated failsafe collimator 1204** receiving the optical signal, which in one embodiment, is detected with a photo-detector, and in another embodiment, is routed to an alternate path.

The function of detecting a failure in a switch array 700, 800, 900, 1000, 1100, is implemented, in one embodiment, by the switches 100' being failsafe switches including failsafe collimators 1204A, 1204B, 1204C, 1204D positioned opposite the input collimators 204A, 204B, 204C, 204D. In this embodiment, failure of an actuator 104 in a switch 100' to move to the extended position results in the associated failsafe collimator 1204 receiving the optical signal, which in one embodiment, is detected with a photo-detector, and in another embodiment, is routed to an alternate path.

From the foregoing description, it will be recognized by those skilled in the art that an optical switch array with multiple inputs and multiple outputs has been provided. The optical switch array includes a plurality of input switches in optical communication with a plurality of intermediate switches, which are in optical communication with a plurality of output switches. With this configuration, the number of inputs and outputs are increased over an individual optical switch without a commensurate increase in losses.

While the present invention has been illustrated by description of several embodiments and while the illustrative embodiments have been described in considerable detail, it is not the intention of the applicant to restrict or in an0y way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A switch array for routing multiple optical signals, said switch array comprising:
    a plurality of input switches each having a plurality of optical inputs and an equal number of a plurality of optical outputs;
    a plurality of output switches each having a plurality of optical inputs and an equal number of a plurality of optical outputs; and
    a plurality of intermediate switches each having a plurality of optical inputs and an equal number of a plurality of optical outputs, each of said plurality of intermediate switches positioned in an optical path between said plurality of input switches and said plurality of output switches,
    each of said plurality of optical outputs from each one of said plurality of input switches connected to one of said plurality of optical inputs of each one of said plurality of intermediate switches, each one of said plurality of optical inputs from each one of said plurality of intermediate switches connected to one of said plurality of optical outputs from each one of said plurality of input switches, each one of said plurality of input switches having at least one connection to each one of said plurality of intermediate switches,
    each of said plurality of optical outputs from each one of said plurality of intermediate switches connected to one of said plurality of optical inputs of each one of said plurality of output switches in one said at least one set of output switches, each one of said plurality of optical inputs from each one of said plurality of output switches connected to one of said plurality of optical outputs from each one of said plurality of intermediate switches, each one of said plurality of output switches having at least one connection to each one of said plurality of intermediate switches, each of said plurality of input switches, said plurality of output switches, and said plurality of intermediate switches being an optical switch including:
  a plurality of input collimators each adapted to receive an optical signal;
  a plurality of output collimators each adapted to transmit said optical signal;
  a plurality of actuators, each of said actuators having a mirror movable between a retracted position and an extended position; and
  an optical bench with a plurality of actuator openings for receiving said plurality of actuators in an array defined by said plurality of input collimators and said plurality of output collimators, said optical bench having a plurality of collimator openings for receiving said plurality of input collimators and said plurality of output collimators;

whereby any one of said plurality of optical inputs of said plurality of input switches is selectively optically connected to any one of said plurality of optical outputs from said plurality of output switches.

2. The switch array of claim 1 wherein each of said plurality of input switches, said plurality of output switches, and said plurality of intermediate switches includes means for switching.

3. The switch array of claim 1 further including means for detecting a failure in one of said plurality of input switches, said plurality of output switches, and said plurality of intermediate switches.

4. A switch array for routing multiple optical signals, said switch array comprising:
  a plurality of input switches each having a plurality of optical inputs and a plurality of optical outputs;
  a plurality of output switches each having a plurality of optical inputs and a plurality of optical outputs; and
  a plurality of intermediate switches each having a plurality of optical inputs and a plurality of optical outputs,
  each one of said plurality of input switches having at least one connection to each one of said plurality of intermediate switches,
  each one of said plurality of output switches having at least one connection to each one of said plurality of intermediate switches,
  each of said plurality of input switches, said plurality of output switches, and said plurality of intermediate switches being an optical switch including:
    a plurality of input collimators each adapted to receive an optical signal;
    a plurality of output collimators each adapted to transmit said optical signal;
    a plurality of actuators, each of said actuators having a mirror movable between a retracted position and an extended position; and
    an optical bench with a plurality of actuator openings for receiving said plurality of actuators in an array defined by said plurality of input collimators and said plurality of output collimators, said optical bench having a plurality of collimator openings for receiving said plurality of input collimators and said plurality of output collimators;
  whereby any one of said plurality of optical inputs of said plurality of input switches is selectively optically connected to any one of said plurality of optical outputs from said plurality of output switches.

5. The switch array of claim 4 wherein each of said plurality of input switches is an optical switch having a number of said plurality of optical inputs equal to a number of said plurality of optical outputs.

6. The switch array of claim 4 wherein each of said plurality of output switches is an optical switch having a number of said plurality of optical inputs equal to a number of said plurality of optical outputs.

7. The switch array of claim 4 wherein each of said plurality of intermediate switches is an optical switch having a number of said plurality of optical inputs equal to a number of said plurality of optical outputs.

8. The switch array of claim 4 wherein each of said plurality of input switches, said plurality of output switches, and said plurality of intermediate switches includes means for switching.

9. The switch of claim 4 further including a plurality of failsafe collimators positioned opposite said plurality of input collimators, said plurality of failsafe collimators receiving said optical signal from a corresponding one of said plurality of input collimators when a selected one of said plurality of actuators fails to move to said extended position.

10. The switch array of claim 4 further including means for detecting a failure in one of said plurality of actuators.

11. The switch array of claim 4 further including means for detecting a failure in one of said plurality of input switches, said plurality of output switches, and said plurality of intermediate switches.

12. The switch array of claim 4 further including means for detecting a failure in the switch array.

13. A switch array for routing multiple optical signals, said switch array comprising:
  a plurality of input switches each having a plurality of optical outputs;
  a plurality of output switches each having a plurality of optical inputs;
  a plurality of intermediate switches routing said plurality of optical outputs from said plurality of input switches to said plurality of optical inputs from said plurality of output switches;
  each of said plurality of input switches, said plurality of output switches, and said plurality of intermediate switches being an optical switch including:
    a plurality of input collimators each adapted to receive an optical signal;
    a plurality of output collimators each adapted to transmit said optical signal;
    a plurality of actuators, each of said actuators having a mirror movable between a retracted position and an extended position; and
    an optical bench with a plurality of actuator openings for receiving said plurality of actuators in an array defined by said plurality of input collimators and said plurality of output collimators, said optical bench having a plurality of collimator openings for receiving said plurality of input collimators and said plurality of output collimators;
  whereby said optical signal applied to each of said plurality of input collimators is selectively routed to any one of said plurality of output collimators;
  whereby any one of a plurality of optical inputs to said plurality of input switches is selectively optically connected to any one of a plurality of optical outputs from said plurality of output switches.

14. The switch array of claim 13 further including means for detecting a failure in one of said plurality of input switches, said plurality of output switches, and said plurality of intermediate switches.

15. A switch array for routing multiple optical signals, said switch array comprising:
   a plurality of input switches each having a plurality of optical inputs and an equal number of a plurality of optical outputs, said plurality of input switches defining at least two sets of input switches, each one of said at least two sets of input switches having a number of input switches equal to a number of said plurality of optical inputs;
   a plurality of output switches each having a plurality of optical inputs and an equal number of a plurality of optical outputs, said plurality of output switches defining at least two sets of output switches, each one of said at least two sets of output switches having a number of output switches equal to a number of said plurality optical outputs;
   a plurality of first intermediate switches having a plurality of optical inputs and a plurality of optical outputs, said plurality of first intermediate switches defining at least two sets of first intermediate switches, each one of said at least two sets of first intermediate switches having a number of first intermediate switches equal to a number of said plurality of optical outputs from one of said plurality of input switches, each one of said plurality of input switches of each one of said at least two sets of input switches having at least one connection to each one of said plurality of first intermediate switches in one of said at least two sets of first intermediate switches;
   a plurality of second intermediate switches having a plurality of optical inputs and a plurality of optical outputs, said plurality of second intermediate switches defining at least two sets of second intermediate switches, each one of said at least two sets of second intermediate switches having a number of second intermediate switches equal to a number of said plurality of optical inputs from one of said plurality of output switches, each one of said plurality of output switches of each one of said at least two sets of output switches having at least one connection to each one of said plurality of second intermediate switches in one of said at least two sets of second intermediate switches, each one of said plurality of first intermediate switches having at least one connection to each one of said at least two sets of second intermediate switches;
   whereby any one of said plurality of optical inputs to said plurality of input switches is selectively optically connected to any one of said plurality of optical outputs from said plurality of output switches.

16. The switch array of claim 15 wherein each of said plurality of input switches is an optical switch having a number of said plurality of optical inputs equal to a number of said plurality of optical outputs.

17. The switch array of claim 15 wherein each of said plurality of output switches is an optical switch having a number of said plurality of optical inputs equal to a number of said plurality of optical outputs.

18. The switch array of claim 15 wherein each of said plurality of first intermediate switches is an optical switch having a number of said plurality of optical inputs equal to a number of said plurality of optical outputs.

19. The switch array of claim 15 wherein each of said plurality of second intermediate switches is an optical switch having a number of said plurality of optical inputs equal to a number of said plurality of optical outputs.

20. The switch array of claim 15 wherein each of said plurality of input switches, said plurality of output switches, said plurality of first intermediate switches, and said plurality of second intermediate switches is an optical switch including:
   a plurality of input collimators each adapted to receive an optical signal;
   a plurality of output collimators each adapted to transmit said optical signal;
   a plurality of actuators, each of said actuators having a mirror movable between a retracted position and an extended position; and
   an optical bench with a plurality of actuator openings for receiving said plurality of actuators in an array defined by said plurality of input collimators and said plurality of output collimators, said optical bench having a plurality of collimator openings for receiving said plurality of input collimators and said plurality of output collimators;
   whereby said optical signal applied to each of said plurality of input collimators is selectively routed to any one of said plurality of output collimators.

21. The switch array of claim 15 wherein each one of said plurality of first intermediate switches in each of said at least two sets of first intermediate switches has at least one of said plurality of optical outputs connected to one of said plurality of second intermediate switches in each of said at least two sets of second intermediate switches.

22. The switch array of claim 15 further including means for detecting a failure in one of said plurality of input switches, said plurality of output switches, said plurality of first intermediate switches, and said plurality of second intermediate switches.

23. A switch array for routing multiple optical signals, said switch array comprising:
   a plurality of input switches each having a plurality of optical inputs and a plurality of optical outputs, said plurality of input switches defining at least one set of input switches;
   a plurality of output switches each having a plurality of optical inputs and a plurality of optical outputs, said plurality of output switches defining at least one set of output switches;
   a plurality of first intermediate switches each having a plurality of optical inputs and a plurality of optical outputs, said plurality of first intermediate switches defining at least one set of first intermediate switches, each of said plurality of first intermediate switches positioned in an optical path between said plurality of input switches and said plurality of output switches,
   a plurality of second intermediate switches each having a plurality of optical inputs and a plurality of optical outputs, said plurality of second intermediate switches defining at least one set of second intermediate switches, each of said plurality of second intermediate switches positioned in an optical path between said plurality of input switches and said plurality of output switches, said plurality of second intermediate switches in selective optical communication with said plurality of first intermediate switches;
   each one of said plurality of input switches in one of said at least one set of input switches optically connected to each one of said plurality of first intermediate switches in one of said at least one set of first intermediate switches, each one of said plurality of output switches in one of said at least one set of output switches optically connected to each one of said plurality of second intermediate switches in one of said at least one set of second intermediate switches, whereby any one of said plurality of optical inputs to said plurality of input switches is selectively optically connected to any one of said plurality of optical outputs from said plurality of output switches.

24. The switch array of claim 23 wherein said plurality of intermediate switches defines at least four sets of intermediate switches, said at least one set of input switches connected to a first half of said at least four sets of intermediate switches and said at least one set of output switches connected to a second half of said at least four sets of intermediate switches, each one of said plurality of intermediate switches of said first half of said at least four sets of intermediate switches in optical communication with each one of said at least four sets of intermediate switches in said second half of said at least four sets of intermediate switches.

25. The switch array of claim 23 wherein each of said plurality of input switches is an optical switch having a number of said plurality of optical inputs equal to a number of said plurality of optical outputs.

26. The switch array of claim 23 wherein each of said plurality of output switches is an optical switch having a number of said plurality of optical inputs equal to a number of said plurality of optical outputs.

27. The switch array of claim 23 wherein each of said plurality of first intermediate switches is an optical switch having a number of said plurality of optical inputs equal to a number of said plurality of optical outputs.

28. The switch array of claim 23 wherein each of said plurality of second intermediate switches is an optical switch having a number of said plurality of optical inputs equal to a number of said plurality of optical outputs.

29. The switch array of claim 23 wherein each of said plurality of input switches, said plurality of output switches, said plurality of first intermediate switches, and said plurality of second intermediate switches is an optical switch including:

a plurality of input collimators each adapted to receive an optical signal;

a plurality of output collimators each adapted to transmit said optical signal;

a plurality of actuators, each of said actuators having a mirror movable between a retracted position and an extended position; and an optical bench with a plurality of actuator openings for receiving said plurality of actuators in an array defined by said plurality of input collimators and said plurality of output collimators, said optical bench having a plurality of collimator openings for receiving said plurality of input collimators and said plurality of output collimators;

whereby said optical signal applied to each of said plurality of input collimators is selectively routed to any one of said plurality of output collimators.

30. The switch array of claim 23 wherein each one of said plurality of first intermediate switches in each of said at least two sets of first intermediate switches has at least one of said selected number of optical outputs connected to one of said plurality of second intermediate switches in each of said at least two sets of second intermediate switches.

31. The switch array of claim 23 further including means for detecting a failure in one of said plurality of input switches, said plurality of output switches, said plurality of first intermediate switches, and said plurality of second intermediate switches.

32. A switch array for routing multiple optical signals, said switch array comprising:

at least two input switches each having a plurality of optical inputs and a plurality of optical outputs, at least two intermediate switches each having a plurality of optical inputs and a plurality of optical outputs, each one of said at least two intermediate switches receiving an optical input from each one of said at least two input switches;

at least two output switches each having a plurality of optical inputs and a plurality of optical outputs, each one of said at least two output switches receiving an optical input from each one of said at least two intermediate switches;

each of said at least two input switches, said at least two intermediate switches, and said at least two output switches being an optical switch including:

a plurality of input collimators each adapted to receive an optical signal;

a plurality of output collimators each adapted to transmit said optical signal;

a plurality of actuators, each of said actuators having a mirror movable between a retracted position and an extended position; and an optical bench with a plurality of actuator openings for receiving said plurality of actuators in an array defined by said plurality of input collimators and said plurality of output collimators, said optical bench having a plurality of collimator openings for receiving said plurality of input collimators and said plurality of output collimators;

whereby said optical signal applied to each of said plurality of input collimators is selectively routed to any one of said plurality of output collimators;

whereby any one of said plurality of optical inputs to said at least two input switches is selectively optically connected to any one of said plurality of optical outputs from said at least two output switches.

33. The switch array of claim 32 wherein each of said at least two input switches is an optical switch having a number of said plurality of optical inputs equal to a number of said plurality of optical outputs.

34. The switch array of claim 32 wherein each of said at least two intermediate switches is an optical switch having a number of said plurality of optical inputs equal to a number of said plurality of optical outputs.

35. The switch array of claim 32 wherein each of said at least two output switches is an optical switch having a number of said plurality of optical inputs equal to a number of said plurality of optical outputs.

36. The switch array of claim 32 further including means for detecting a failure in one of said at least two input switches, said at least two output switches, and said at least two intermediate switches.

37. A switch array for routing multiple optical signals, said switch array comprising:

at least two sets of input switches with each set having a plurality of input switches, each one of said plurality of input switches having a plurality of optical inputs and a plurality of optical outputs;

at least two sets of first intermediate switches with each set having a plurality of first intermediate switches, each one of said plurality of first intermediate switches having a plurality of optical inputs and a plurality of optical outputs, each one of said at least two sets of input switches in optical communication with each one of said plurality of first intermediate switches in one of said at least two sets of first intermediate switches;

at least two sets of second intermediate switches with each set having a plurality of second intermediate switches, each one of said plurality of second intermediate switches having a plurality of optical inputs and a plurality of optical outputs, each one of at least two sets of first intermediate switches in optical communication with each one of said at least two sets of second intermediate switches; and at least two sets of output switches with each set having a plurality of output switches, each one of said plurality of output switches having a plurality of optical inputs and a plurality of optical outputs, each one of said at least two sets of output switches in optical communication with each one of said plurality of second intermediate switches in one of said at least two sets of second intermediate switches;

whereby any one of said plurality of optical inputs to said plurality of input switches is selectively optically connected to any one of said plurality of optical outputs from said at least two output switches.

38. The switch array of claim 37 wherein each of said plurality of input switches is an optical switch having a number of said plurality of optical inputs equal to a number of said plurality of optical outputs.

39. The switch array of claim 37 wherein each of said plurality of first intermediate switches is an optical switch having a number of said plurality of optical inputs equal to a number of said plurality of optical outputs.

40. The switch array of claim 37 wherein each of said plurality of second intermediate switches is an optical switch having a number of said plurality of optical inputs equal to a number of said plurality of optical outputs.

41. The switch array of claim 37 wherein each of said at least two output switches is an optical switch having a number of said plurality of optical inputs equal to a number of said plurality of optical outputs.

42. The switch array of claim 37 wherein each of said plurality of input switches, said plurality of first intermediate switches, said plurality of second intermediate switches, and said plurality of output switches is an optical switch including:

a plurality of input collimators each adapted to receive an optical signal;

a plurality of output collimators each adapted to transmit said optical signal;

a plurality of actuators, each of said actuators having a mirror movable between a retracted position and an extended position; and an optical bench with a plurality of actuator openings for receiving said plurality of actuators in an array defined by said plurality of input collimators and said plurality of output collimators, said optical bench having a plurality of collimator openings for receiving said plurality of input collimators and said plurality of output collimators;

whereby said optical signal applied to each of said plurality of input collimators is selectively routed to any one of said plurality of output collimators.

43. The switch array of claim 37 further including means for detecting a failure in one of said plurality of input switches, said plurality of output switches, said plurality of first intermediate switches, and said plurality of second intermediate switches.

* * * * *